Patented Jan. 28, 1941

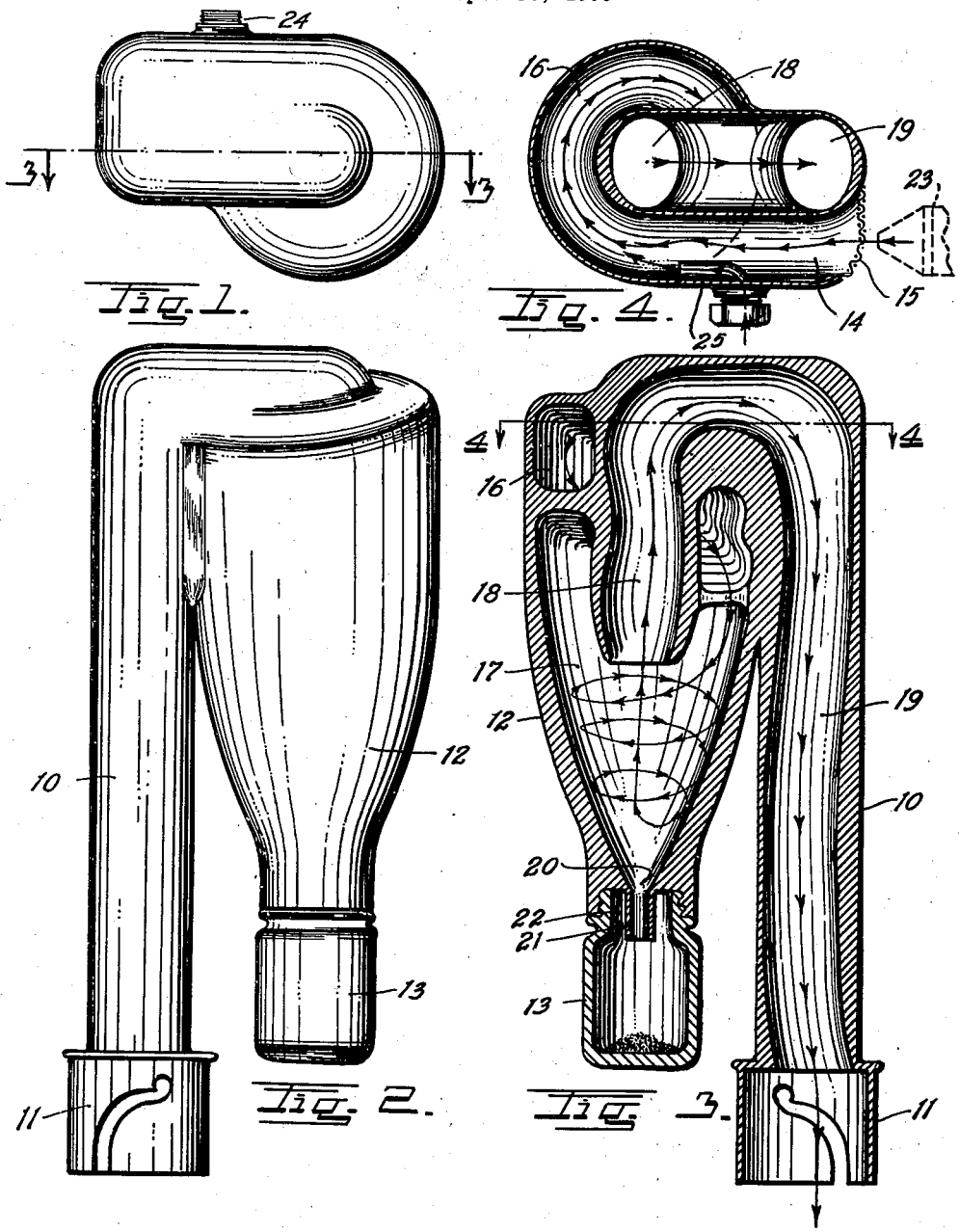

2,229,824

UNITED STATES PATENT OFFICE 2,229,824

AIR CLEANER FOR INTERNAL COMBUSTION ENGINES

William A. Shaw, Denver, Colo.

Application September 16, 1939, Serial No. 295,209

3 Claims. (Cl. 183—83)

The invention relates to an air cleaner for the intake of automotive engines and has for its principal object the provision of a cleaner which will remove the finest dust particles from the air entering an automotive engine; which will not require oil baths, filtering pads, or the like; and which will create no obstruction to the flow of the intake air.

Heretofore cleaners of the centrifugal dry dust type or "whirl" type were made as shown in applicant's prior Patent No. 2,155,911. These cleaners were not uniformly successful. Occasionally cleaners which were low in efficiency when new would be found to be very efficient after several months of use. Upon examination it was found that the unsuccessful cleaners had misformed passages or accidental obstructions such as small drops of adhering solder in the passages. These irregularities, however slight, would disturb the smooth uniform flow of the air and create whirls, or eddy currents in the air stream which would interfere with the deposition of the foreign particles. After months of use these obstructions would become worn away by the abrasive effect of the dust laden air stream to produce an efficient passage and an efficient cleaner.

Another object of the invention is to provide a process for designing and finishing air cleaners of this type which will initially produce an absolutely smooth, stream-lined inner surface for the passage of the air so that no restrictions to the flow will be possible and so that no eddy currents can be created which would throw the dust and other foreign materials in the air stream so as to be carried through the cleaner.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a plan view of an improved air conditioner as produced by the process herein recited.

Fig. 2 is an elevational view thereof.

Fig. 3 is a vertical section, taken on the line 3—3, Fig. 1.

Fig. 4 is a horizontal cross section looking downward on the line 4—4, Fig. 3.

The improved air conditioner comprises: a tubular standard 10 formed with any desired coupling sleeve 11 at its bottom by means of which it may be attached to the intake of an automotive engine carburetor. The standard 10 supports a bottle-shaped cleaner housing 12 into the bottom of which a removable dirt receptacle 13 is secured. The air enters the cleaner through an intake passage 14 protected by means of a suitable screen 15.

The intake passage 14 opens to a descending spiral, or whirl passage 16 which discharges into an enlarged whirl chamber 17. From the whirl chamber, the air rises through a riser passage 18, thence flows into and downwardly through an outlet passage 19 in the standard 10 to the engine. The sides of the whirl chamber 17 incline smoothly downward to a dust discharge orifice 20 which communicates through a downwardly depending tube 21 within the interior of the dirt receptacle 13.

It can be readily seen that the heavier than air particles being carried by the air stream will be thrown outwardly against the walls of the whirl chamber 17 and will be carried downwardly along these walls by the descending spiral air current flowing around the chamber. The deposition of the foreign materials in the whirl chamber is also facilitated by the sudden expansion of the air therein due to the greater volume of the chamber. This causes all foreign materials to settle downward and the lighter portions thereof will be forced downwardly by the descending whirl of the air currents until they drop through the discharge orifice into the receptacle 13.

The discharge orifice to the receptacle 13 is so small that no air currents can be created in the receptacle itself. Any disturbance therein, however, is trapped in the annular trapping chamber 22 around the tube 21.

After much experimentation, it was found that in order to make a cleaner of this type successful in removing the exceedingly fine dust particles, it was necessary that all abrupt changes in the air flow be avoided, that all pockets other than the whirl chamber itself must be eliminated, and that the air must flow with uniform velocity and without interference through all passages of the cleaner until the whirl chamber is encountered.

Many attempts were made to design passages which would meet these requirements but owing to the difficulty of locating the path of least resistance to the flow of the air stream within the cleaner, it was difficult to theoretically design these passages. It was found, however, that the air stream itself could be employed to design, shape and polish passages of maximum efficiency.

To accomplish this a vapor of a suitable surface coating material, such as quick drying "Duco," is introduced at the intake orifice, of a cleaner having approximately the correct design and finish, by means of a suitable spray gun, positioned as indicated in broken line at 23, while the cleaner itself is connected with a powerful source of suction. It is found that the coating material builds up in all pockets and in all portions of the passages wherein the air velocity is low.

After an application of the coating material, powdered emery or similar granular abrasive is fed into the intake 14 and drawn through the cleaner by the air suction. The abrasive strikes the walls of the passages at the points where the air stream impinges and grinds away these portions of the passages. It also grinds away all projections to produce a smooth, highly polished surface. After repeated alternate applications of the building-up material and the abrasive material, the air develops a highly polished streamlined passage having a shape and a surface contour of minimum resistance to the flow of the air such as approximated on the accompanying drawing. The abrasive after each application is collected in the receptacle 13.

Cleaners prepared in accordance with the design produced by the air stream as above are highly efficient in recovering even colloidal atmospheric dust. This efficiency is even further increased by introducing crank-case vapors into the air stream to increase the specific gravity of the particles carried by the air. These vapors can be introduced at any desired point. Provision is made for introducing them, however, through a threaded nipple 24 in the side of the intake passage 14. The nipple communicates with a suction tube 25 on the interior of the passage which is directed in the direction of the air flow. The rush of air past the suction tube creates a partial vacuum to draw the crank case vapors into the air stream.

The term "whirl type" air cleaner as used in this specification and in the claims refers to any cleaner in which the dry dust and foreign materials are separated from the air stream by centrifugal action of the air itself.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A method of reducing the resistance to air flow in an air whirl type of air cleaner comprising: drawing a stream of air through said cleaner; and feeding a quick-drying, air-hardening fluid into the air stream so that the fluid will collect and harden in the pockets of low air velocity in said cleaner.

2. A method of reducing the resistance to air flow in an air whirl type of air cleaner comprising: drawing a stream of air through said cleaner; and feeding a quick-drying, air-hardening fluid into the air stream so that the fluid will collect, fill, and harden in the pockets of low air velocity in said cleaner, thence passing granular abrasive material into the air stream to abrade away the portions of said passages against which the air impinges.

3. A method of reducing the resistance to air flow in air cleaners of the whirl type comprising: causing a stream of air to flow through said cleaner; spraying quick-drying lacquer into the air stream as it enters the cleaner for a sufficient time to allow the lacquer to build up and fill in the pockets of low air velocity in said cleaner; allowing the lacquer to harden in said pockets; thence passing powdered abrasive material into the air stream as it enters said cleaner to wear away the lacquer of said cleaner to produce a continuously curvated passage wall paralleling at all points the axis of natural air flow through said cleaner.

WILLIAM A. SHAW.